US011410682B2

(12) United States Patent
Eleftheriou et al.

(10) Patent No.: US 11,410,682 B2
(45) Date of Patent: Aug. 9, 2022

(54) METHOD FOR DETECTING AND RECOGNIZING AN EMOTIONAL STATE OF A USER

(71) Applicant: Sentio Solutions, Inc., San Francisco, CA (US)

(72) Inventors: Georgios Eleftheriou, Santa Clara, CA (US); Panagiotis Fatouros, Athens (GR); Charalampos Tsirmpas, Athens (GR)

(73) Assignee: Sentio Solutions, Inc., San Francisco, CA (US)

( * ) Notice: Subject to any disclaimer, the term of this patent is extended or adjusted under 35 U.S.C. 154(b) by 11 days.

(21) Appl. No.: 16/460,105

(22) Filed: Jul. 2, 2019

(65) Prior Publication Data

US 2020/0075039 A1 Mar. 5, 2020

Related U.S. Application Data

(63) Continuation-in-part of application No. 15/648,730, filed on Jul. 13, 2017, now abandoned.

(60) Provisional application No. 62/361,808, filed on Jul. 13, 2016.

(51) Int. Cl.
*G10L 25/63* (2013.01)
*G06F 11/32* (2006.01)
*G06V 40/20* (2022.01)

(52) U.S. Cl.
CPC ............ *G10L 25/63* (2013.01); *G06F 11/327* (2013.01); *G06V 40/20* (2022.01)

(58) Field of Classification Search
CPC ........ G10L 25/63; G10L 17/26; G06F 11/327; G06V 40/15; G06V 40/20; G06V 40/70; G06Q 10/10
See application file for complete search history.

(56) References Cited

U.S. PATENT DOCUMENTS

| | | | | |
|---|---|---|---|---|
| 5,647,834 A | * | 7/1997 | Ron | A61B 5/16 600/23 |
| 6,151,571 A | * | 11/2000 | Pertrushin | G10L 17/26 704/207 |
| 8,644,491 B2 | * | 2/2014 | Flockhart | G06Q 10/06311 379/265.12 |
| 8,675,860 B2 | * | 3/2014 | Eicholz | G06Q 50/2057 379/265.01 |
| 9,711,056 B1 | * | 7/2017 | Nguyen | A61B 5/7425 |

(Continued)

*Primary Examiner* — Rex R Holmes
*Assistant Examiner* — Sana Sahand
(74) *Attorney, Agent, or Firm* — Run8 Patent Group, LLC; Peter Miller

(57) ABSTRACT

A method includes: prompting a user to recite a story associated with a first target emotion; recording the user reciting the story and recording a first timeseries of biosignal data via a set of sensors integrated into a wearable device worn by the user; accessing a first timeseries of emotion markers extracted from the voice recording; labeling the first timeseries of biosignal data according to the first timeseries of emotion markers; generating an emotion model linking biosignals to emotion markers for the user based on the first emotion-labeled timeseries of biosignal data; detecting a second instance of the first target emotion exhibited by the user based on a second timeseries of biosignal data and the emotion model; and notifying the user of the second instance of the first target emotion.

17 Claims, 6 Drawing Sheets

(56) References Cited

U.S. PATENT DOCUMENTS

| | | | |
|---|---|---|---|
| 9,788,777 B1* | 10/2017 | Knight | G10L 25/63 |
| 9,812,151 B1* | 11/2017 | Amini | G06T 13/40 |
| 9,953,650 B1* | 4/2018 | Falevsky | G10L 15/22 |
| 10,515,631 B2* | 12/2019 | Kleppe | G10L 17/26 |
| 2015/0012463 A1* | 1/2015 | Rosenthal | G10L 25/63 |
| | | | 706/11 |
| 2017/0310820 A1* | 10/2017 | Kao | G10L 25/63 |
| 2018/0042542 A1* | 2/2018 | Cronin | G10L 25/84 |
| 2018/0077095 A1* | 3/2018 | Deyle | H04L 51/10 |

* cited by examiner

METHOD FOR DETECTING AND RECOGNIZING AN EMOTIONAL STATE OF A USER

CROSS-REFERENCE TO RELATED APPLICATIONS

This application is a continuation-in-part of U.S. patent application Ser. No. 15/648,730, filed on 13 Jul. 2017, which claims the benefit of U.S. Provisional Application No. 62/361,808, filed on 13 Jul. 2016, each of which is incorporated in its entirety by this reference.

TECHNICAL FIELD

This invention relates generally to the field of biosensors and more specifically to a new and useful method for detecting and recognizing emotional biomarkers in the field of biosensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
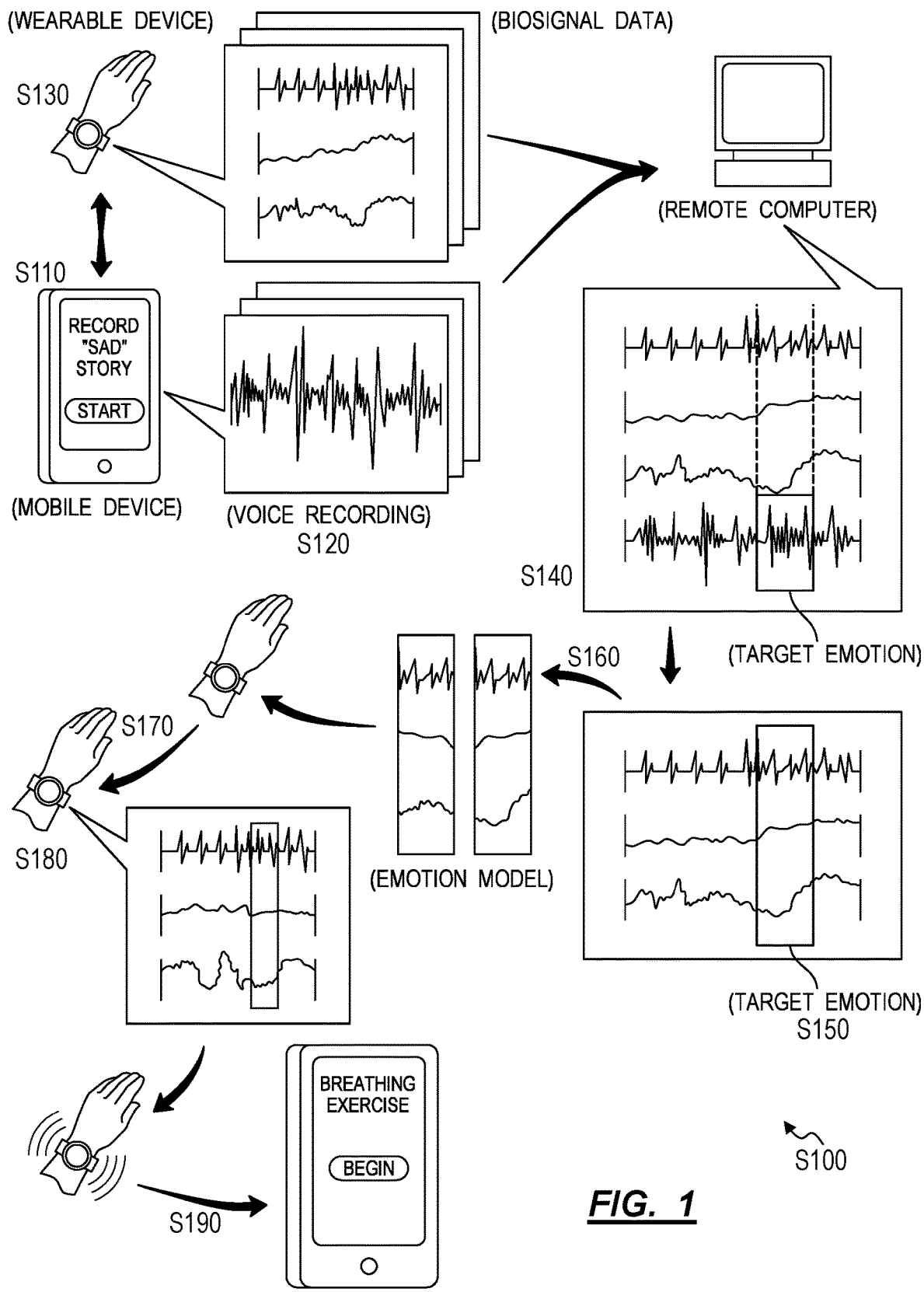
FIG. 1 is a flowchart representation of a method.
Figure 2:
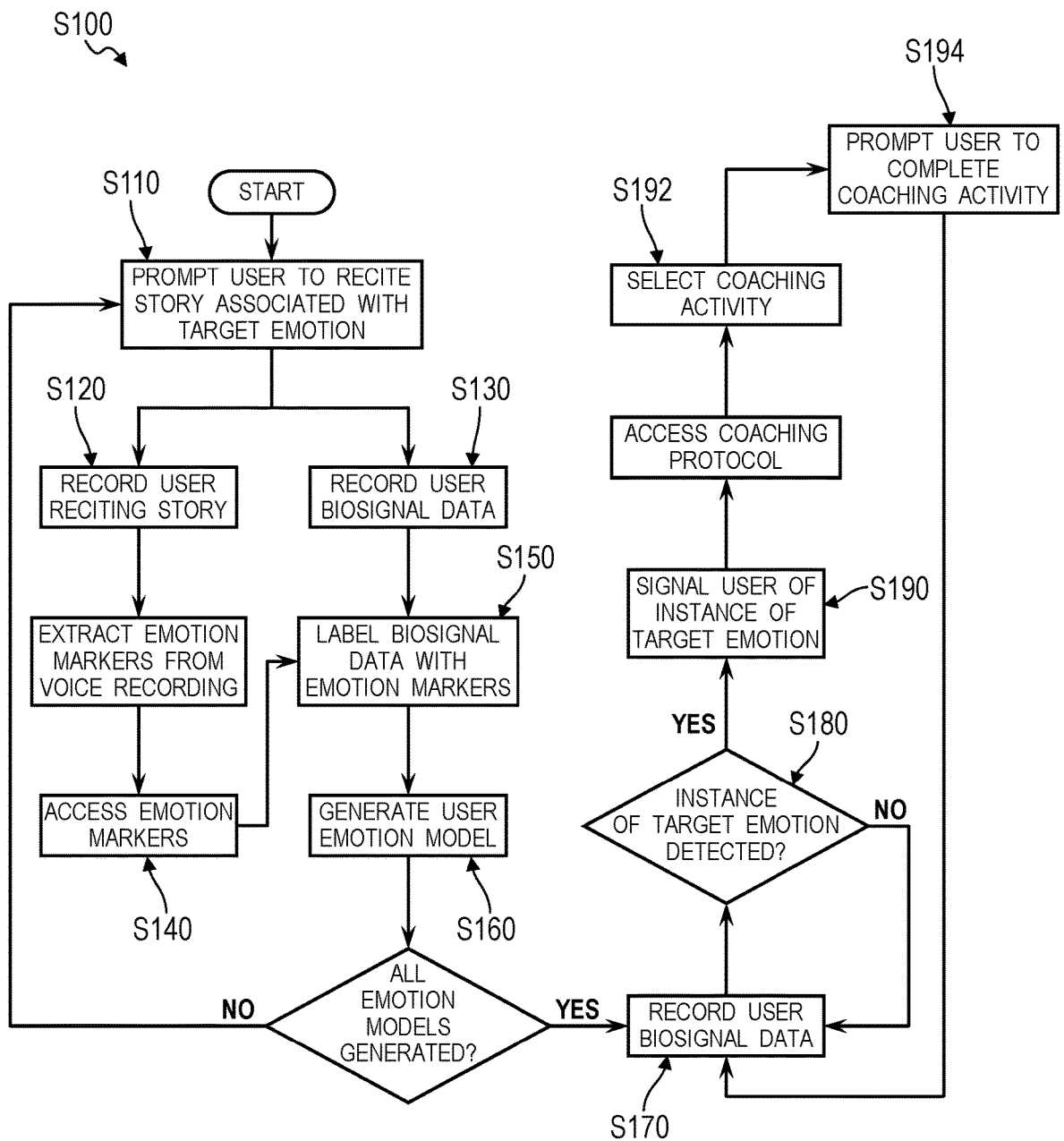
FIG. 2 is a flowchart representation of one variation of the method.
Figure 3:
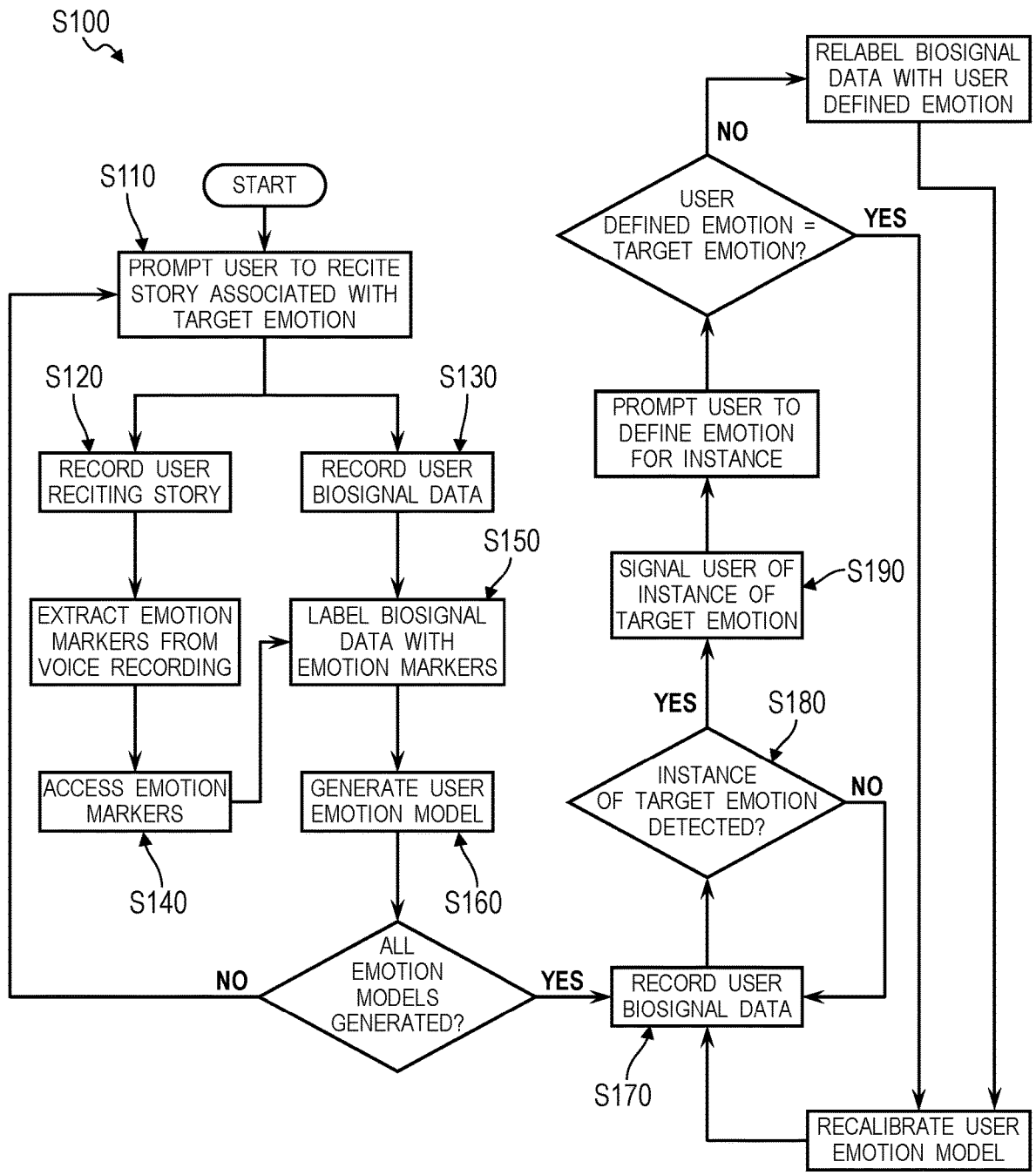
FIG. 3 is a flowchart representation of one variation of the method.

As shown in FIG. 1-3, a method S100 for tracking emotions of a user includes: prompting the user to orally recite a story associated with a first target emotion in Block S110; recording a voice recording of the user reciting the story during a first period of time in Block S120; during the first period of time, recording a first timeseries of biosignal data via a set of sensors integrated into a wearable device worn by the user in Block S130; accessing a first timeseries of emotion markers extracted from the voice recording and including a first emotion marker for a first instance of the first target emotion exhibited by the user during the first period of time in Block S140; labeling the first timeseries of biosignal data according to the first timeseries of emotion markers to generate a first emotion-labeled timeseries of biosignal data in Block S150; generating an emotion model linking biosignals to emotion markers for the user based on the first emotion-labeled timeseries of biosignal data in Block S160; during a second period of time succeeding the first period of time, recording a second timeseries of biosignal data via the set of sensors integrated into the wearable device worn by the user in Block S170; detecting a second instance of the first target emotion exhibited by the user based on the second timeseries of biosignal data and the emotion model in Block S180; and notifying the user of the second instance of the first target emotion in Block S190.

2. Applications

Generally, Blocks of the method S100 can be executed by a companion application executing on a mobile device in cooperation with a wearable device worn by a user and a remote computer system (hereinafter the "system") to calibrate an emotion model that links physiological biosignal data (e.g., heart-rate, heart-rate variability, skin temperature, skin moisture, electrodermal activity, etc.) of the user to emotions exhibited by the user. In particular, the companion application can: prompt the user to recount a story associated with a target emotion (e.g., happy, sad, stressed, distressed, etc.); and capture a voice recording of the user orally reciting this story. During the user's recitation of this story, the wearable device can record a timeseries of physiological biosignal data of the user via a suite of integrated sensors. The wearable device can offload the timeseries of physiological biosignal data to the mobile device—such as in real-time or in intermittent data packets—and the companion application can package these physiological biosignal data with the voice recording and return these data to the remote computer system. The remote computer system can then: access the voice recording; extract timeseries of pitch, voice speed, voice volume, pure tone, and/or other characteristics of the user's voice from the voice recording; and transform these timeseries of pitch, voice speed, voice volume, pure tone, and/or other characteristics of the user's voice into timestamped instances (and magnitudes) of the target emotion exhibited by the user while reciting the story. The remote computer system can then: synchronize these timeseries of physiological biosignal data and instances of the target emotion; and implement regression, machine learning, deep learning, and/or other techniques to derive links or correlations between these physiological biosignals and the target emotion for the user.

The companion application, the wearable device, and the remote computer system can repeat this process to derive correlations between physiological biosignal data and other target emotions, such as during a single (e.g., ten minute) setup process or during intermittent setup periods during the user's first day or week wearing the wearable device. The remote computer system can then compile these correlations between physiological biosignal data and target emotions into an emotion model unique to the user, such as by compiling these correlations into a new emotion model for the user or by calibrating an existing generic emotion model to align with these correlations.

The mobile device can then: load a local copy of this emotion model to the wearable device (e.g., via the mobile device); record timeseries physiological biosignal data of the user via its integrated biosensors; locally interpret the user's emotions in (near) real-time based on these timeseries physiological biosignal data; and output audible and tactile feedback responsive to detecting certain emotions (e.g., anger, sadness, happiness). The wearable device can also return timestamped emotion markers for these emotions to the mobile device, such as only responsive to detecting changes in type or changes in magnitude (e.g., more then 20%) of emotions exhibited by the user. The mobile device can then write these timestamped emotion markers in a local or remote user file, supply related content (e.g., breathing exercises, meditation guidance) to the user based on these emotion markers, and/or request additional information related to these emotion markers from the user (e.g., confirmation of a detected emotion, feedback regarding the situation that triggered the emotion, a description of how the user felt, what the user was thinking during the instance, any bodily reactions, etc.). The wearable device can therefore leverage the emotion model thus calibrated to the user to compress multiple streams of biosignal data—such as heart-rate, skin temperature, skin moisture, and electrodermal activity recorded at varying rates (e.g., between 1 Hz and 100 Hz)—into an intermittent low-bandwidth, high-value stream of emotion markers.

(Alternatively, the companion application can load a local copy of the emotion model, ingest streams of physiological biosignal data broadcast by the wearable device, implement the emotion model to transform these biosignal data into emotion markers, and then selectively serve content and prompts to the user based on these emotion markers.)

Additionally, the mobile device or companion application can: load an emotion-specific coaching activity (e.g., a breathing exercise for a stressful emotion, a journaling exercise for a happy emotion, etc.); and prompt the user to complete the emotion-specific coaching activity via the mobile device each time the wearable device detects an instance of the particular target emotion. By prompting the user (or "intervening") during a negative emotional event, the system can enable the user to regain her composure in this moment and thus reduce negative long-term health effects associated with chronic stress and anxiety. Concurrently, by prompting the user during a positive emotional event, the system can enable the user to isolate a circumstance that triggered this positive emotional event and thus guide the user toward developing healthier emotional habits.

Furthermore, the system can: prompt the user to periodically confirm instances of target emotions; aggregate physiological biosignal data occurring around these manual emotion labels; and then (re)calibrate her emotion model based on these paired manual emotion labels and physiological biosignal data such that the user's emotion model continues to represent an accurate map from physiological biosignal data to emotion markers even as the user's body and environment change over time. For example, the system can leverage user feedback to (re)calibrate her emotion model to physiological changes occurring: on short time scales (e.g., during different activities, such as working, commuting, socializing, relaxing, etc.); on intermediate time scales (e.g., during different seasons, holidays, etc.); and on longer time scales (e.g., throughout the user's different life stages, such as adolescence, pregnancy, retirement, etc.).

Furthermore, responsive to detecting instances of a particular emotion in physiological biosignal data based on the user's emotion model, the mobile device or companion application can prompt the user to select or describe an emotion trigger (e.g., a performance review, a breakup, walking down a certain street, a funny movie, etc.) that preceded this instance of a target emotion. Over time, the system can aggregate a list of emotion triggers for this emotion and return this list of emotion triggers to the user (or the user's therapist or mental health professional) in order to enable the user to identify, recognize, and seek or avoid such situations.

Therefore, the wearable device, the computer system, and the remote computer system can cooperate to generate and calibrate an emotion model unique to the user based on concurrent physiological biosignal data and a voice recording of the user thus captured during a setup or calibration period. The wearable device and the companion application can then cooperate to identify a target emotion exhibited by the user in real time and notify the user of each exhibition of the target emotion.

3. Calibration Session Initiation Period

Blocks of the method S100 recite, during a calibration period: loading a companion application onto a user's mobile device; wirelessly (or via wired connection) connecting the mobile device to the wearable device; running diagnostic tests to confirm the functionality and accuracy of the set of sensors (e.g., an electrodermal activity sensor, a heart rate sensor, a skin temperature sensor, an inertial measurement unit (or "IMU"), an ambient humidity sensor, and an ambient temperature sensor) integrated into the wearable device; prompting the user to enter demographic data (e.g., age, sex, education level, income level, marital status, occupation, weight, etc.) to generate a user profile; and prompting the user to select a first target emotion for calibration. Generally, the companion application can—upon loading onto the mobile device—prompt the user to enter demographic user data to predetermine expected ranges of biosignal data for the user (e.g., a higher average skin temperature for a male user, a lower average skin temperature for a user of below average weight, a higher average skin conductance for a user in a high stress job, etc.) to enable the system to more quickly generate an emotion model for a target emotion for the user by narrowing the dimensionality of the emotion space (or threshold) required to trigger an emotion marker for a target emotion. For example, in response to receiving input from the user indicating that the user's occupation is a high-stress occupation (e.g., police officer, stock trader, etc.), the system can load preliminary emotion models including higher baseline stress indicating biosignals.

The companion application can then: serve a list of target emotions to the user on the mobile device; and prompt the user to select a first target emotion for calibration via voice recording. In one implementation, the system can serve an abridged list of primary target emotions (e.g., grief, joy, etc.) that have more pronounced ranges of physiological biosignal data that allow the system to more quickly identify instances of the target emotion to generate user-specific emotion models and thus—by leveraging previously acquired user physiological biosignal data—more quickly generate user-specific emotion models for a set of secondary target emotions (e.g., ennui, annoyance, etc.) with less pronounced ranges of physiological biosignal data. For example, the companion application can: prompt the user to select a target emotion from the abridged list of primary target emotions; in response to the user selecting anger as the primary target emotion, execute a calibration session for anger; store physical biosignal data from the calibration session for anger in an emotion model for the user; prompt the user to select a target emotion from the set of secondary target emotions; and—in response to the user selecting annoyance as the secondary target emotion—accessing the physiological biosignal data from the emotion model for anger to generate a preliminary emotion model for annoyance. In another implementation, the companion application can prompt the user to rank the list of primary target emotions and—in response to receiving the ranking of the primary target emotions from the user—prompt the user to recite emotional stories only for a subset of target emotions (e.g., for the highest ranked emotion and an additional emotion having complementary biosignal data) to reduce the number of voice recordings required to generate emotion models encapsulating a substantially full range of emotions for the user.

The companion application can also prompt the user to select a tracking schedule (e.g., times of day the wearable device can actively scan the user's biosignals), an alert type (e.g., haptic feedback, a tone, etc.), an alert schedule (e.g., continuous, once an hour, once a day, etc.), and other user preferences to enable the system to alert the user of instances of target emotions in an unobtrusive manner throughout the day, thus increasing engagement with the wearable device by the user and reducing the time required to generate an accurate emotion model for the user.

In another implementation, the companion application can prompt the user to share all or part of her user profile with another user (e.g., a licensed therapist, a significant other, etc.) running the companion application on a different device such that the system can update the other user with certain data about the user (e.g., emotional events and trends). For example, the system can: generate a user profile including a user-specific emotion model for a target emotion the user would like to discuss during a therapy session with a licensed therapist; track instances of the target emotion for a particular period of time (e.g., a week); prompt the user to share a list of instances of the target emotion from the particular period of time with her licensed therapist; and— upon receiving instructions from the user to share a list of instances of the target emotion—send the list of instances of the target emotion to the licensed therapist's device running the companion application. The therapist's device running the companion application can then prompt the user and the licensed therapist concurrently to discuss particular instances of the target emotion and prompt the licensed therapist to select coaching activities for the companion application to serve to the user in response to the system detecting future instances of the target emotion. In this implementation, the system can share the user data with another device continuously, or only for certain periods of time (e.g., during or immediately preceding a session with a therapist) to ensure privacy for the user.

4. Story Prompt and Voice Recording

Blocks S110 and S120 of the method S100 recite: prompting the user to orally recite a story associated with a first target emotion; and recording a voice recording of the user reciting the story during a first period of time. Generally, in Blocks S110 and S120 the mobile device or companion application can prompt the user to tell a story regarding a first target emotion (e.g. a story involving the user experiencing happiness, sadness, anger, etc.) and record the story via an integrated microphone on the mobile device.

In one implementation, the mobile device can display the prompt on the screen of the mobile device and direct the user to read a generic emotional story from a set of emotional stories. In another implementation, the mobile device or companion application can prompt the user to recite a personal emotional story associated with the target emotion. By prompting the user to orally recite a personal emotional story, the system can elicit (or draw out) the target emotion in the user by requiring the user to recall and recite the story, thus provoking the associated emotions that the user experienced during the events of the surrounding story.

In one implementation, the mobile device or companion application can prompt the user to recite a story regarding particular life events (e.g., the birth of a child, graduating high school, etc.) commonly associated with particular target emotions. In this implementation, the mobile device or companion application can prompt the user to confirm the type of emotion(s) the user experienced during recitation of the story. For example, the mobile device or companion application can: prompt the user to recite a story about the birth of a child; record the user reciting the story; display a list of possible target emotions associated with the birth of the child (e.g., joy, distress, etc.); and prompt the user to select one or more emotions that the user associated with the event. Additionally, the mobile device or companion application can flag sound clips of segments of the story; play back the sound clips for the user; and prompt the user to label the sound clips with one or more target emotions that the user experienced during recitation of the particular sound clip.

In another implementation, the mobile device or companion application can prompt the user to recite a story of a minimum length in order to acquire a minimum number of data points for instances of the target emotion. For example, the mobile device or companion application can prompt the user to recite a story at least two minutes in length and display a timer counting down two minutes on the user's mobile device. The system can also—upon detection of a long period of silence and prior to completion of a minimum story length—prompt the user to continue the story or display guiding questions to extend the story (e.g., "describe how that made you feel," "please elaborate," "what happened next?" etc.)

In another implementation, the mobile device or companion application can: prompt the user to recite a story; in response to the user selecting a record button displayed on the user's mobile device, record the user reciting the story; and trigger the wearable device to initiate recording biosignal data until the user selects the record button a second time in order to cease recording. For example, the mobile device or companion application can—in response to the user selecting the record button—send the trigger to the wearable device to begin recording a timeseries of biosignal data and timestamp the beginning of the biosignal data and the beginning of the voice recording to synchronize the two data streams and to enable later applying of the data from the voice recording onto the biosignal data.

5. Physiological Biosignal Data

Block S130 of the method S100 recites: during the first period of time, recording a first timeseries of biosignal data via a set of sensors integrated into a wearable device worn by the user. Generally, in Block S130 the wearable device can access a set of sensors (e.g., a electrodermal activity sensor (or "EDA" sensor), a heart rate or photoplethysmogram sensor (or "PPG" sensor), a skin temperature sensor, an inertial measurement unit (hereinafter "IMU"), an ambient humidity sensor, and an ambient temperature sensor, and record biosignal data at each sensor at a series of time increments concurrently with recording the voice recording of the user story via the mobile device.

Figure 5:
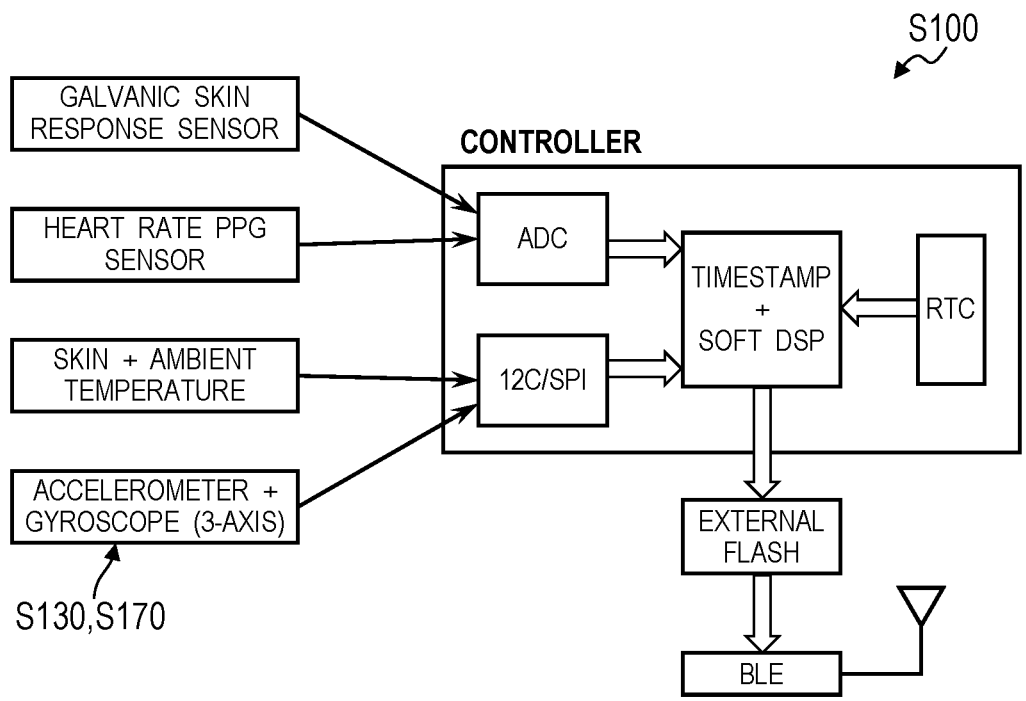
FIG. 5 is a flow chart representation of one variation of the method.
Figure 6A:
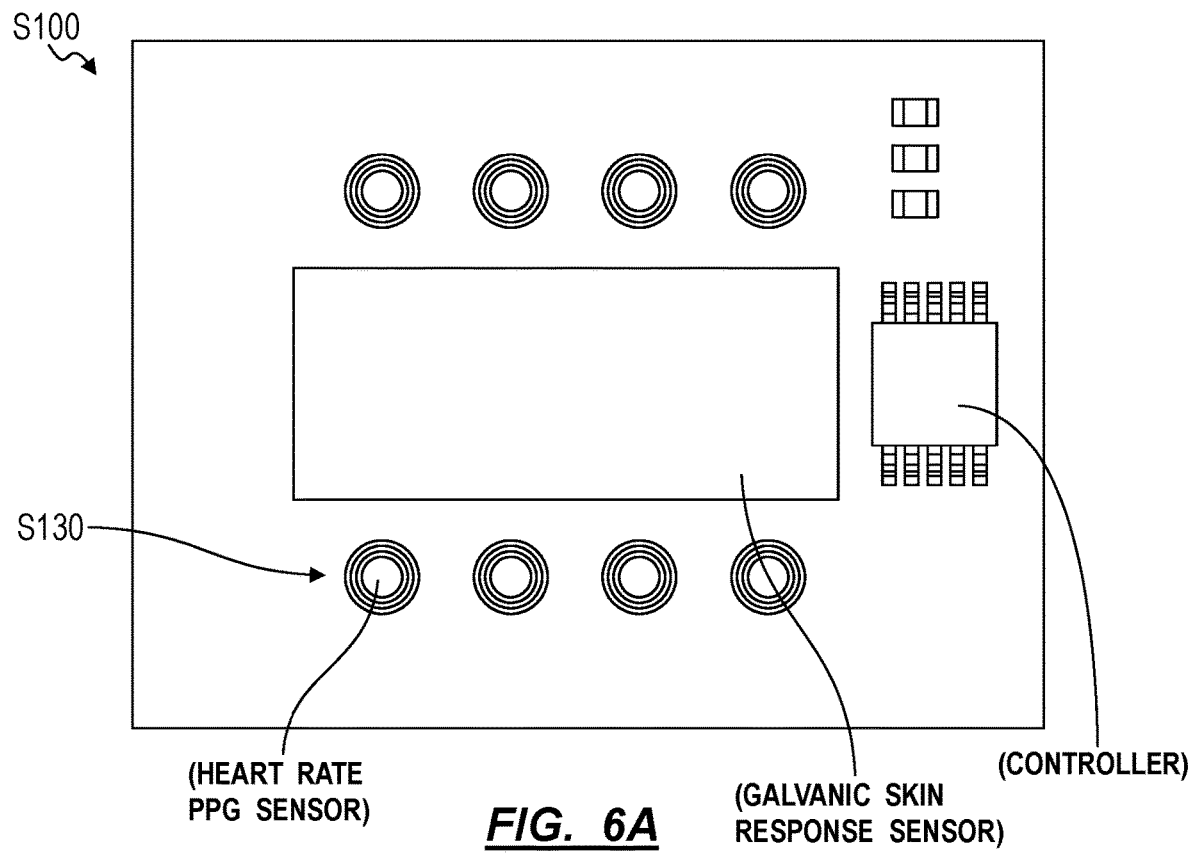
FIG. 6A is a schematic representation of one variation of the method.
Figure 6B:
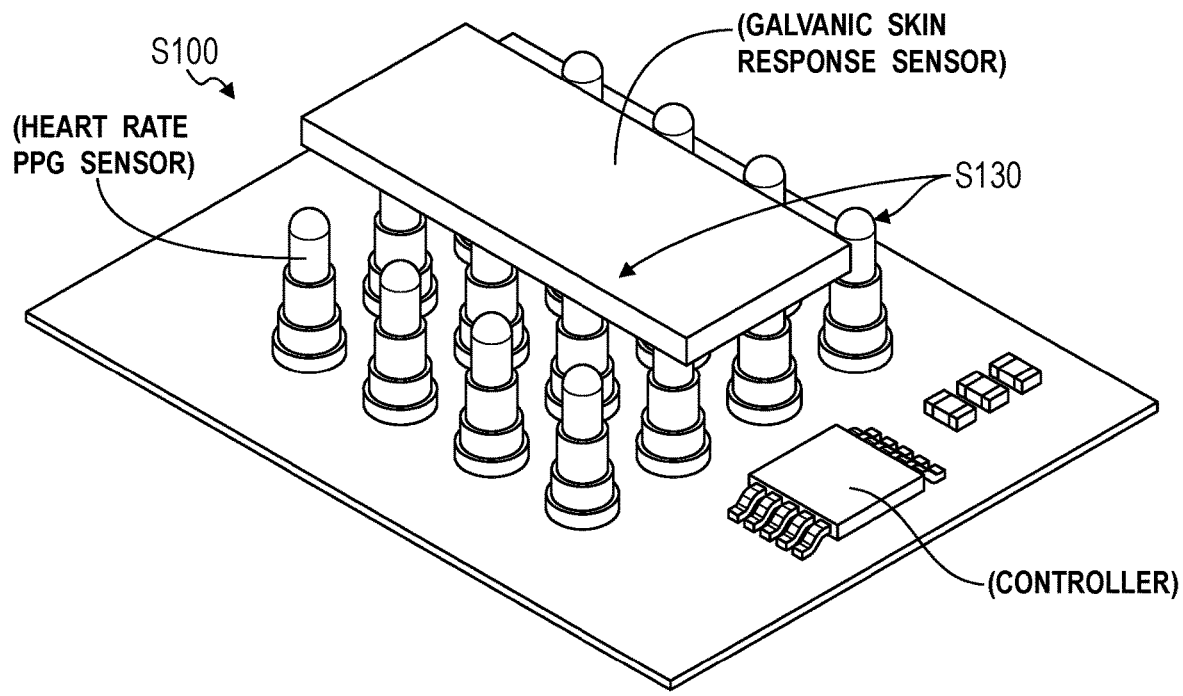
FIG. 6B is a schematic representation of one variation of the method.

In one implementation, while recording the user reciting the emotional story, the system can access: the electrodermal activity sensor to record the skin conductance of the user; the heart rate sensor to record the pulse of the user; the IMU to record the motion of the user; the skin temperature sensor to record the user's skin temperature; the ambient humidity sensor to record the relative humidity of the air around the user; and the ambient temperature sensor to record the relative heat of the air around the user, as shown in FIGS. 5, 6A, and 6B. For example, the system can: initiate a voice recording of the user; record a current skin temperature of 100 degrees via the skin temperature sensor; record an ambient temperature of 101 degrees via the ambient temperature sensor; calculate the user's real skin temperature as 98 degrees based on the user's recorded skin temperature and the recorded ambient temperature; and write a baseline skin temperature of 98 degrees to the user's general user profile. The system can then store the user's baseline skin temperature locally on the wearable device and reference the user's baseline skin temperature while recording the user's biosignal data at a later time.

Similarly, the wearable device can record a baseline resting heart rate, a baseline skin conductance, and a baseline level of activity for the user and store all the baseline data locally on the wearable device or on the remote computer system as part of the user profile.

In one implementation, the wearable device can sample biosignal data intermittently (e.g., one a five-second interval) to reduce power consumption and minimize data files. In another implementation, the wearable device can selectively choose times to record biosignal data continuously instead of intermittently (e.g., if the system detects the user is trending toward an instance of a target emotion). After recording the biosignal data at the wearable device, the wearable device can transmit the biosignal data to the mobile device for storage in the user's profile, such as locally on the mobile device and/or remotely in a remote database.

In one implementation shown in FIGS. 5, 6A, and 6B, the wearable device records physiological biosignal data of the user (e.g., skin moisture, skin temperature, and heart rate variability) concurrently with recording ambient environmental data (e.g., humidity, ambient temperature) and other related data (e.g., the motion of the user or motion of the user's mode of transportation). For example, the wearable device can: access the electrodermal activity sensor to detect the user's current skin moisture data; identify that the user's current skin moisture data is above a normal threshold; access the ambient humidity sensor to detect an ambient humidity level; identify the ambient humidity sensor is above the normal threshold; identify that the ambient humidity level is affecting the skin moisture data; and calculate a real skin moisture level based on the ambient humidity level. Therefore, the system can identify environmental situations that can affect the biosignal data of the user (e.g., washing her hands, running, etc.).

Furthermore, the wearable device can: access the set of sensors integrated into the wearable device worn by the user to acquire a first set of physiological biosignal data; and transmit the first set of physiological biosignal data to the mobile device. The companion application—executing on the user's mobile device—can then validate the first set of physiological biosignal data with generic baseline physiological biosignal data from a generic user profile (e.g., a profile defining a range of standard resting heart rates for a generic user, a range of normal skin temperatures, etc.), or from additional sources (e.g. confirming the ambient humidity recorded by the wearable device with the ambient humidity recorded by a third-party weather service, the time of day with the internal clock on the mobile device, etc.). For example, the wearable device can: record a particular physiological biosignal for the user (e.g., a resting heart rate); access a generic user profile including an acceptable (or expected) range for the particular biosignal (e.g., a resting heart rate between 60-100 beats per minute or "bpm"); and—if the biosignal data is in acceptable range (e.g., 65 bpm)—store user biosignal data as a normal baseline for the user. Conversely, if the physiological biosignal data is not in the acceptable range (e.g., a resting heart rate of 40 bpm), the system can run diagnostics on the sensor or prompt the user to confirm the wearable device is on (or properly installed). The system can also prompt the user to override out of range data (e.g., a marathon runner with a resting heart rate of 40 bpm can manually validate her resting heart rate.)

In another implementation, the companion application can: prompt the user to engage in a series of activities (e.g., sitting, walking, holding her breath, etc.); record a series of biosignal data via the set of sensors integrated into the wearable device; label the biosignal data with the associated activity; and store the labeled biosignal data in a user profile to enable the system to eliminate false positives triggered by normal activities.

5.1 Triggering Biosignal Recording

In one implementation, the companion application can return a command to the wearable device to begin recording the timeseries of biosignal data immediately upon prompting the user to recite the emotional story and before the user begins reciting the story. In this implementation, the wearable device can trigger the suite of sensors to begin recording physiological biosignal data immediately upon serving the user with the prompt—while the user is considering a story that elicits the target emotion—to share with the companion application. The wearable device can then offload the physiological biosignal data recorded prior to the user reciting the emotional story to the companion application to store as pre-story physiological biosignal data. The companion application can then scan the pre-story physiological biosignal data for emotional markers indicating instances of the target emotion that the user likely experienced while brainstorming a particular life event to recite as the emotional story associated with the target emotion.

In another implementation, the wearable device can: continuously record physiological biosignal data from the user to a local buffer (e.g., to a five-minute rolling buffer); in response to the user selecting a record button on the mobile device, the mobile device can query the wearable device for physiological biosignal data for a time period starting from the prompt time for the emotional story for the target emotion to the current time when the user selected the record button on the mobile device; and store the physiological biosignal data as pre-story physiological biosignal data to be processed for emotional markers as described above. Furthermore, in response to the user selecting a stop-recording button on the mobile device, the companion application can query the wearable device for physiological biosignal data for a time period beginning from the start time of the voice recording of the emotional story to the current time when the user selected the stop-recording button on the mobile device; and store the physiological biosignal data as intra-story physiological biosignal data to be processed for emotional markers in conjunction with the voice recording. The companion application can merge pre-story and intra-story physiological biosignal data into one timeseries of physiological biosignal data for the target emotion. Furthermore, the companion application can query the wearable device for physiological biosignal data recorded by the wearable device prior to the companion application prompting the user to recite the emotional story associated with the target emotion and store the timeseries of physiological biosignal data as baseline reference physiological biosignal data for the user, as the user may not yet be thinking about an emotional story that results in a measurable physiological change.

In another implementation, the system can: continuously record physiological biosignal data from the user to the local buffer on the wearable device; and—in the absence of indication of termination of the voice recording on the mobile device prior to the local buffer reaching a maximum capacity—instruct the wearable device to send the full buffer to the mobile device at the buffer maximum capacity and continue to buffer the voice recording on wearable device. The companion application can then combine each of the full buffer files into one file of physiological biosignal data.

In another implementation, the wearable device can stream physiological biosignal data to the mobile device during the initial setup period prior to prompting the user to recite the emotional story associated with the target emotion and store the stream as baseline reference physiological biosignal data. The companion application can implement similar methods and techniques to categorize segments of the physiological biosignal data into baselines, pre-story, intra-story, post-story, and/or timeseries physiological biosignal data to generate a robust user-specific emotion model including varying intensities of emotion markers for the target emotion.

6. Story Conclusion

Blocks of the method S100 recite: recording a voice recording of the user reciting an emotional story as described above; in response to detecting the end of the user's story, terminating the voice recording and terminating the recording of the physiological biosignal data; timestamping the voice recording and the timeseries of physiological biosignal data; transmitting the timeseries of physiological biosignal data from the wearable device to the mobile device; packaging the voice recording and the timeseries of physiological biosignal data into a single timestamped data file; and sending the single timestamped data file to the remote computer system to generate emotion markers for the target emotion. Generally, the mobile device or companion application can record the user reciting the emotional story; stop the recording in response to receiving input from the user indicating the end of the emotional story (e.g., the user pressing a stop-recording button on the mobile device); store the voice recording locally on the mobile device; encrypt the voice recording; and transmit the encrypted voice recording to a remote computer system to extract emotion markers.

In one implementation, the companion application can: initiate a timer in response to receiving an indication from the user that the user has started reciting the emotional story (e.g., the user pressing a start-recording button); record the user reciting the emotional story; stop the recording in response to expiration of a timer (e.g., after two minutes); store the voice recording locally on the mobile device; encrypt the voice recording; and transmit the encrypted voice recording to a remote computer system to extract emotion markers. In this implementation, the companion application can display a timer counting down on the screen of the user's device to continuously notify the user of the time constraint. In another implementation, the companion application can track the timer internally (i.e., without displaying the timer on screen) to reduce distraction to the user to avoid potentially generating discomfort in the user and distorting the physiological biosignal data for the target emotion.

In one implementation, the companion application can automatically detect a period of silence during the recitation of the story and terminate the recording in response to detecting the period of silence. Generally, the companion application can: access the integrated microphone on the mobile device while prompting the user to recite an emotional story; detect an audio signal indicating that the user has begun speaking; in response to detecting the user speaking, begin recording the voice recording; detect a period of silence (e.g., a ten second pause); in response to detecting the period of silence, stop recording; store the voice recording locally on the mobile device; encrypt the voice recording; and transmit the encrypted voice recording to a remote computer system to extract emotion markers. By not requiring the user to start and stop the voice recording, the system can reduce distraction to the user in order to acquire more accurate physiological biosignal data from the user during recitation of the emotional story.

In another implementation, the system can: access a generic emotion model including a set of generic emotion markers; scan for the set of generic emotion markers at the wearable device as the user records the emotional story; and—if the wearable device has not yet detected any change in physiological biosignal data to a minimum relative change in value (e.g., a minimum change of heart rate, minimum change of skin temperature, minimum change of skin conductance, any features derived from the physiological biosignal data, or some combination thereof) indicating an instance of the target emotion—prompt the user to continue the story until the wearable device detects biosignal data above the minimum relative change in value indicating an instance of the target emotion. Conversely, if the wearable device detects a change in physiological biosignal data above the minimum threshold indicating an instance of the target emotion prior to the user completing the emotional story, the mobile device or companion application can: terminate the voice recording early; bundle the voice recording and the biosignal data; and transmit the voice recording and biosignal data to the remote server to extract the user-specific emotion markers. The mobile device or companion application can alert the user that the mobile device has stopped recording or stop recording without alerting the user to maintain a seamless experience for the user.

7. Data Aggregation

Blocks of the method S100 recite: recording a timeseries of biosignal data as described above; writing the timeseries of biosignal data to local storage on the wearable device; and transmitting the biosignal data to the mobile device. Generally, the wearable device can record packets of biosignal data for a certain sample time (e.g., 100 milliseconds, 5 seconds, 1 minute, etc.); timestamp each packet of biosignal data; and transmit the packets wirelessly to the mobile device. In one implementation, the mobile device can combine a set of data packets into a single file (e.g., combining all data packets received during recitation of the story by the user into a single file of biosignal data). In another implementation, the mobile device can: combine the timeseries of biosignal data and the voice recording into a single data file and transmit the data file to the remote server to extract emotion markers and label the timeseries of biosignal data.

In another implementation, the companion application can access a live stream of the voice recording and process the voice recording into a timeseries of emotion markers in real-time during recitation of the emotional story by the user. The companion application can: concurrently access a live stream of biosignal data inbound from the wearable device; synchronize the stream of biosignal data with the timeseries of emotion markers derived from the video; and port these emotion markers onto the stream of biosignal data, such as in the form of emotion labels. The companion application can then implement deep learning or artificial intelligence techniques locally to develop a user-specific emotion model linking biosignals of the user to presence and/or magnitude of the target emotion exhibited by the user. (Alternately, the companion application can offload these biosignals, emotion markers, and/or raw voice recordings to the remote computer system for near-real-time processing into this user-specific emotion model for the target emotion). The companion application can then load and immediately implement this user-specific emotion model to interpret presence and/or magnitude of the target emotion exhibited by the user based on subsequent biosignal data received from the wearable device. Alternatively, the mobile device can upload this emotion model to the wearable device for local interpretation of presence and/or magnitude of the target emotion based on live biosignal data detected by its integrated sensors; the wearable device can then offload presence, magnitude and/or confidence for presence of the target emotion to the mobile device for tracking and monitoring, such as at a rate of 1 Hz, on a five-minute interval, or in response to detecting a change in primary type or magnitude of emotion exhibited by the user.

8. Emotion Marker Extraction from Voice Recording

Block S140 of the method S100 recites: accessing a first timeseries of emotion markers extracted from the voice recording and including a first emotion marker for a first instance of the first target emotion exhibited by the user during the first period of time. Generally, in Block S140 the remote computer system can decompose the voice recording into component signals and isolate areas of the voice recording indicating an instance of the target emotion (e.g., increased pitch, voice speed, and voice volume indicating a stress emotion). In response to isolating the instances of the target emotion, the remote computer system can generate a timeseries of emotion markers for the duration of the voice recording and then label a timeseries of biosignal data with the timeseries of emotion markers.

In one implementation, the system can: access the set of sensors integrated into the wearable device worn by the user; and—in response to detecting the user standing or moving—prompt the user to sit or recline during recitation to eliminate extraneous motion data. In one implementation, the remote computer system can scan the voice recording; extract pitch data, voice speed data, voice volume data, and pure tone data from the voice recording; isolate a set of instances of the first target emotion based on the pitch data, voice speed data, voice volume data, and pure tone data; and label and time-stamp each instance of the first target emotion with an emotion marker. For example, the remote computer system can: scan a voice recording of a user telling a story regarding a target emotion (e.g., a story about a happy event in the user's life); isolate each instance in the story where qualities of the user's voice indicate that the user is experiencing a happy emotion; generate a timeseries of happy emotion markers; and access a first happy emotion marker.

In another implementation, the remote computer system can: extract multiple emotion markers from the voice recording; and assign an emotion intensity to each emotion marker. The remote computer system can then label the associated timeseries of biosignal data with an emotion marker and the associated emotion intensity. The remote computer system can then: detect an instance of a first target emotion at a first emotion intensity; detect a second instance of the first target emotion at a second emotion intensity; and—upon detecting that the second emotion intensity is of a greater magnitude than the first emotion intensity—notify the user of the second instance of the first target emotion.

In yet another implementation, the remote computer system can extract an emotion change marker from the voice recording. Generally, the remote computer system can extract a set of emotion markers as described above; identify a change from a first target emotion to a second target emotion; and generate an emotion change marker for that period of the voice recording. The remote computer system can further isolate emotion change markers from different sets of target emotions. For example, the remote computer system can; identify the user changing from a happy emotion to a sad emotion; identify the user changing from a happy emotion to an angry emotion; and generate emotion change markers for each type of emotional change.

In one variation of the method S100, the companion application can play back the voice recording on the user's mobile device and prompt the user to manually tag the voice recording with her emotions. Generally, the companion application can prepopulate a list of emotions rendered on the mobile device display—as the mobile device plays back the voice recording—and prompt the user to select from the prepopulated list of emotions. In another variation, the companion application can prompt the user to select from a prepopulated list of emotions rendered on the mobile device display while the user is telling the emotional story. In these variations, the mobile device can generate a timeseries of manual emotion markers for the voice recording, and label the timeseries of biosignal data with the manual emotion markers. The system can then extract the emotion markers as described previously, and verify the emotion markers derived from the voice recording based on manual emotion markers.

8.1 Emotion Marker Extraction from Video Recording

In one variation of the method S100, the companion application can: prompt the user to record a video of her reciting a story associated with the first target emotion; record a video recording of the user reciting the story via a camera integrated into the user's mobile device; and upload the video the remote computer system. The remote computer system can then: detect the user's face in the video recording; extract facial features and gestures of the user from the video recording; interpret instances of the target emotion (and other emotions) exhibited by the user during the video recording based on the facial features and gestures of the user thus detected in the video recording; generate a timeseries of emotion markers for the duration of the voice recording; and then label a concurrent timeseries of biosignal data with this timeseries of emotion markers. The system can thus generate a timeseries of emotion markers based on visual data recorded of the user as the user recites a story associated with a target emotion, such as in addition to or instead of based on audio data of the user reciting an emotion story. For example, the system can generate emotion markers based on both the voice recording and the video recording, verify audio-based emotion markers based on video-based emotion markers, and label concurrent biosignal data with these verified emotion markers.

9. Data Fusion: Biosignal and Voice Recording

Block S150 of the method S100 recites: labeling the first timeseries of biosignal data according to the first timeseries of emotion markers to generate a first emotion-labeled timeseries of biosignal data. Generally, in Block S150 the remote computer system can: access the first timeseries of biosignal data; access the first timeseries of emotion markers; and—at a time segment corresponding to each emotion marker—label the corresponding biosignal data at the appropriate time segment in the first timeseries of biosignal data with the emotion marker. For example, the remote computer system can: identify a point in the voice recording that the user's voice indicates that the user is experiencing the target emotion; label the point in the voice recording with an emotion marker and a timestamp; and label the biosignal data from the same timestamp in the first timeseries of biosignal data with the emotion marker. Thus, the remote computer system can identify unique user-specific biosignals associated with target emotions based on the user's voice recording. In one implementation, the remote computer system can label periods of the timeseries of biosignal data not corresponding to an emotion marker as not associated with the target emotion. The remote computer system can then identify baseline biosignal data not associated with an emotional event to better establish a necessary framework to differentiate emotional biosignal data from non-emotional biosignal data.

In one implementation, the mobile device can send a time synchronization protocol to the wearable device at the start of the voice recording to ensure a one-to-one correlation between the timeseries of biosignal data and the voice recording. In another implementation, the mobile device can access the IMU data from the wearable device and compare vibration data from the IMU with the vocal vibrations of the voice recording to synchronize the timeseries of biosignal data with the voice recording.

10. Emotion Model and Emotion Tracking

Block S160 of the method S100 recites: generating an emotion model linking biosignals to emotion markers for the user based on the first emotion-labeled timeseries of biosignal data. Generally, in Block S160 the system can generate the first emotion-labeled timeseries of biosignal data as described above; implement regression, artificial intelligence, machine learning, deep learning, and/or other techniques to derive links or correlations between these physiological biosignals and the target emotion for the user; and generate a user-specific emotion model to accurately recognize when the user is experiencing an instance of the target emotion (e.g., a happy, sad, stressed, or distressed emotional event) based on physiological biosignal data alone. In one implementation, the system can access the first emotion labeled timeseries of physiological biosignal data; identify a first instance of the first target emotion in the first emotion labeled timeseries of physiological biosignal data; assign a confidence score to the first instance of the first target emotion; and—if the confidence score for the first instance of the first target emotion is above a minimum confidence score (e.g., 75%)—add the first instance of the first target emotion to the emotion model. The system can assign confidence scores for the remaining instances of the first target emotion to build the emotion model only with instances above the minimum confidence score, such that the emotion model only contains a minimum amount of data to accurately predict instances of the target emotion, which can then be stored locally on the wearable device (and/or stored remotely on the mobile device or the remote computer system).

In another implementation, the system can define a user notification frequency for the emotion model based on the target emotion such that the wearable device can send a notification of an instance of a target emotion (and the associated physiological biosignal data) to the mobile device at a first rate for a first target emotion (e.g., every five seconds for an angry emotion) and a second rate for a second target emotion (e.g., once per minute for a happy emotion). For example, the wearable device can send packets of data to the mobile device once per minute following the detection of an instance of a happy emotion and—upon detection of an instance of an angry emotion—begin to send packets of data to the mobile device once every five seconds to better monitor and manage the negative emotion in the user. Additionally, the system can increase the rate of notification based on the intensity level of a target emotion (e.g., sending packets of data to the mobile device once every five seconds upon detecting the user is 50% angry and then sending packets of data to the mobile device once every second upon detecting the user is 90% angry).

In another implementation, the system can generate a new emotion model for the user by calibrating an existing generic emotion model based on the first emotion-labeled timeseries of biosignal data. For example, the system can: access a generic emotion model for an anger target emotion; extract emotion markers for the anger target emotion based on the user's emotional story as described above; add the user-specific emotion markers to the generic anger emotion model; and remove or replace generic emotion markers from the emotion model if the user's biosignal data does not fall within the threshold of the generic emotion markers while the user is reciting the emotional story.

In another implementation, the system can generate a set of emotion models for a set of target emotions as described above; generate a user model based on the set of emotion models; scan for a series of emotion markers associated with a particular emotion in the set of target emotions; and send a signal to the user notifying the user of an instance of the target emotion from the set of target emotions. The system can thus track and notify the user of a full range of emotions experienced by the user.

10.1 Manual Emotion Model

Figure 4:
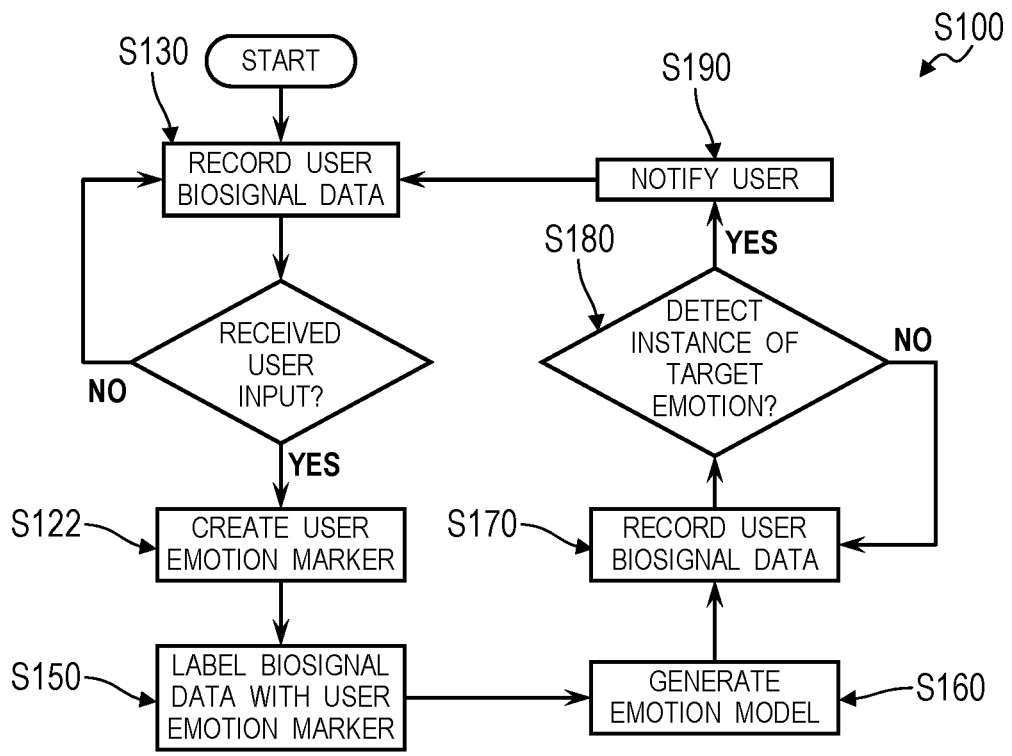
FIG. 4 is a flowchart representation of one variation of the method.

As shown in FIG. 4, one variation of the method S100 includes: recording a first timeseries of biosignal data via a set of sensors integrated into a wearable device worn by the user in Block S130; in response to receiving input from the user indicating an instance of a target emotion, creating a user emotion marker in Block S122; labeling the first timeseries of biosignal data according to the user emotion marker to generate an emotion-labeled time series of biosignal data in Block S150; generating an emotion model linking biosignals to user emotion markers for the user based on the first emotion-labeled timeseries of biosignal data in in Block S160; and—during a second period of time succeeding the first period of time—recording a second timeseries of biosignal data via the set of sensors integrated into the wearable device worn by the user in Block S170; detecting a second instance of the first target emotion exhibited by the user based on the second timeseries of biosignal data and the emotion model in Block S180; and sending a signal to the user notifying the user of the second instance of the first target emotion in Block S190. Generally, the system can: continuously collect biosignal data from the user via the wearable device; generate a user emotion marker each time the user inputs an instance of a target emotion on her mobile device; and generate an emotion model based only on input from the user (e.g., if the user has not yet recited a story associated with a target emotion). The companion application can aggregate the user emotion markers and physiological biosignal data to generate the first emotion-labeled timeseries of biosignal data; implement regression, artificial intelligence, machine learning, deep learning, and/or other techniques to derive links or correlations between these physiological biosignals and the target emotion for the user; and generate a user-specific emotion model to accurately predict when the user is experiencing an instance of the target emotion (e.g., a happy, sad, stressed, or distressed emotional event) based on physiological biosignal data alone without the need for the user to recite a personal emotional story.

10.2 Generic Emotion Models

Blocks of the method S100 recite: accessing a generic user model including a set of generic emotion models; recording a first timeseries of biosignal data via a set of sensors integrated into a wearable device worn by the user;

detecting a first instance of a target emotion; and sending a signal to the user notifying the user of the first instance of the first target emotion. Generally, the wearable device can load a generic user model if a user has not yet initialized her profile such that the system can begin recording biosignal data via the wearable device without (or prior to) recording the user reciting a story associated with a target emotion.

In one implementation, the companion application can prompt the user to select demographic data about the user (e.g., job, sex, weight, etc.) and load a generic profile to the wearable device based on the demographic data. For example, the companion application can prompt the user to select a job type. Then in response to the user selecting "business consultant" for job type, the companion application can access a generic profile for a "high stress" user and including coaching activities tailored to stress management.

In another implementation, the system can: generate an emotion model linking biosignals to emotion markers extracted from a voice recording of the user for a first target emotion as described above; and access and implement a generic emotion model for a second target emotion for which the user has not yet performed a calibration session. Additionally, the system can: access the emotion model for the first target emotion generated from the voice recording; and—based on the emotion model generated from the voice recording—update the generic emotion model for the second target emotion based on the user-specific emotion-labeled timeseries of biosignal data from the emotion model generated from the voice recording.

In another implementation, the companion application can: prompt the user to select a subset of target emotions; in response to receiving the selection from the user, prompt the user to recite emotional stories only for the subset of target emotions; record voice recordings of the emotional stories; generate emotion models for the subset of target emotions based on the voice recordings as described above; and load generic emotion models for the remaining target emotions to reduce unnecessary setup time for the user.

11. Additional Emotions

Blocks of the method S100 recite generating additional emotion models for a set of target emotions. Generally, the system can: generate an emotion model for a first target emotion as described above; prompt the user to orally recite a story associated with a second target emotion; record a voice recording of the user reciting the story associated with the second target emotion; record a timeseries of biosignal data via a set of sensors integrated into a wearable device worn by the user; access a timeseries of emotion markers extracted from the voice recording and including an emotion marker for an instance of the second target emotion exhibited by the user; label the timeseries of biosignal data according to the timeseries of emotion markers to generate an emotion-labeled timeseries of biosignal data associated with the second target emotion; and generate an emotion model for the second target emotion linking biosignals to emotion markers for the user based on the second emotion-labeled timeseries of biosignal data. In one implementation, the companion application can prompt the user to recite the story associated with the second target emotion at a time immediately following the user reciting the story associated with the first target emotion. In another implementation, the companion application can delay prompting the user to recite the story associated with the second target emotion until a minimum amount of time has elapsed (e.g., an hour, a day, etc.) for the user to return to a baseline level of emotion following the user's recitation of the story regarding the first target emotion. The companion application can also prompt the user to complete certain activities to accelerate the user's return to a baseline level of emotion (e.g., playing a game on her mobile device, reading a particularly mundane block of text, meditation, etc.), or prompt the user to complete each recording session immediately after waking up for the day. In another implementation, the system can assess the sensors on the wearable device to track when the user has returned to a baseline emotional state and—in response to detecting that the user has returned to a baseline emotional state—prompt the user to recite a story associated with a new target emotion. Additionally, the system can detect via the integrated sensors on the wearable device that the user is not in a baseline emotional state at the beginning of a first voice recording session by accessing a generic emotion model associated with the target emotion and identifying the user's current emotional state based on generic physiological biosignal data.

In another implementation, the companion application can prompt the user to record a series of stories regarding a series of emotions in a particular order (e.g., happy, relaxed, sad, and annoyed) such that the system can leverage the natural transfer by the user from one target emotion to the next target emotion in the series of emotions. The companion application can also prompt the user to select a set of emotions that the user would like to track and prompt the user to recite a series of emotional stories based on the user's selection.

In one implementation, the system can generate an emotion model to detect more than one emotion concurrently. For example, the companion application can prompt the user to recite a story associated with a set of emotions instead of a single emotion (e.g., a sad story with a happy ending, or a reversal of fortune) and prompt the user to input which emotions the user is currently feeling throughout recitation of the story (e.g., the user can input that she is happy at the beginning of the story, angry in the middle of the story, and sad at the end of the story). Additionally, the wearable device can automatically detect significant shifts in the user's biosignal data during recitation of an emotional story and prompt the user via the user's mobile device to identify the emotion in real time at each shift. Furthermore, the companion application can replay the story to the user and prompt the user to confirm emotion types and magnitudes and log the magnitude of the shift.

In another implementation, the system can detect combinations of emotions (e.g., happy and sad at the same time or "bittersweet") and prompt the user to identify an emotion level (e.g., 80% happiness, 30% sadness, etc.). The system can then combine all current emotion models into one user emotion model and notify the user of multiple emotions concurrently, or simply notify the user of a generic emotional event.

12. Daily Emotion Tracking and User Notification

Blocks S170, S180, and S190 of the method S100 recite:—during a second period of time succeeding the first period of time—recording a second timeseries of biosignal data via the set of sensors integrated into the wearable device worn by the user; detecting a second instance of the first target emotion exhibited by the user based on the second timeseries of biosignal data and the emotion model; and sending a signal to the user notifying the user of the second instance of the first target emotion. Generally, in Blocks S170, S180, and S190—after creation of the emotion model for the user—the wearable device can: access the set of sensors to record additional biosignal data of the user; access the emotion model of the user; and—upon detection of biosignal data indicating an instance of the first target emotion (e.g., an emotional event) based on the emotion model—alert the user of the second instance of the first target emotion to enable the user to be mindful of the user's emotional state. In one implementation, the wearable device can detect an instance of a target emotion (e.g., a happy moment) and signal the user of the instance via the wearable device (e.g., by haptic feedback, emitting a tone, etc.) or via a notification at the mobile device. In another implementation, the companion application can log a series of instances of the target emotion throughout the day and display the list to the user at the end of the day via the user's mobile device. Additionally, the companion application can identify daily trends regarding the target emotion and inform the user of these trends. The system can also prompt the user at a set time of the day to avoid disrupting the user during the course of the day.

12.1 Intervention

As shown in FIG. 2, one variation of the method S100 includes, a third period of time succeeding the second period of time: recording a third timeseries of biosignal data via the set of sensors integrated into the wearable device worn by the user; detecting a third instance of the first target emotion exhibited by the user based on the third timeseries of biosignal data and the emotion model; and—in response to detecting the third instance of the first target emotion— sending a second signal to the user notifying the user of the second instance of the first target emotion; accessing a coaching protocol associated with the first target emotion and including a coaching activity to alter the emotional state of the user in Block S192; and prompting the user to complete the coaching activity via a mobile device in Block S194. Generally, in this variation, the system can: detect an instance of the first target emotion via the wearable device and send a signal to the user as described above; via the user's mobile device, load a coaching protocol (e.g., a set of coaching activities geared to maintain or move past an emotion); and prompt the user to complete a coaching activity (e.g., a breathing exercise, a mood diary, cognitive and behavioral exercises, and activities which are tailored to the user, etc.). For example, the system can: access the set of sensors on the wearable device; detect an instance of a distress emotion exhibited by the user; send a signal to the user by vibrating the wearable device; access a stress coaching protocol generated for the user; and prompt the user via the mobile device to begin a breathing coaching activity to help the user regulate the stress emotional state.

In one implementation, the wearable device can continue to monitor the biosignals of the user and send a signal to the user once the user's physiological biosignals indicate the instance of the target emotion has ended. The system can record an effectiveness value for each of the coaching protocols for the target emotion based on the time elapsed from the start of the coaching protocol to the end of the instance of the target emotion and either promote or remove particular coaching protocols based on the efficacy of each coaching protocol (e.g., a coaching protocol associated with a shorter elapsed time to the end of the instance of the target emotion can be served to the user more often).

The system can also record a success rate for a coaching protocol for the target emotion based on the average time elapsed from the start of the coaching protocol to the end of the instance of the target emotion. The system can remove a coaching protocol from the emotion model for the user if the coaching protocol falls below a certain success rate (e.g., below a 50% success rate).

1.3. Emotion Triggers

Blocks of the method S100 recite, at a third period of time succeeding the second period of time: recording a third timeseries of biosignal data via the set of sensors integrated into the wearable device worn by the user; detecting a third instance of the first target emotion exhibited by the user based on the third timeseries of biosignal data and the emotion model; in response to detecting the third instance of the first target emotion, prompting the user to define an emotion trigger associated with the first target emotion via a mobile device; and logging the emotion trigger in the emotional model. Generally, the system can: detect an instance of the first target emotion and send a signal to the user as described above; prompt—via the user's mobile device—the user to define the emotion trigger (e.g., a new project or deadline, receiving a gift, receiving a text message from an ex, getting a raise/promotion, etc.); and log the emotion trigger in the emotion model. The system can then use the emotion triggers to predict instances of particular target emotions (e.g., an instance of a stress emotion can be more likely during the user's workday, during holidays, or during certain seasons of the year, etc.) and preemptively prompt the user to complete a coaching activity associated with the particular target emotion.

14. User Feedback: Refining the Emotion Model

Figure 7:
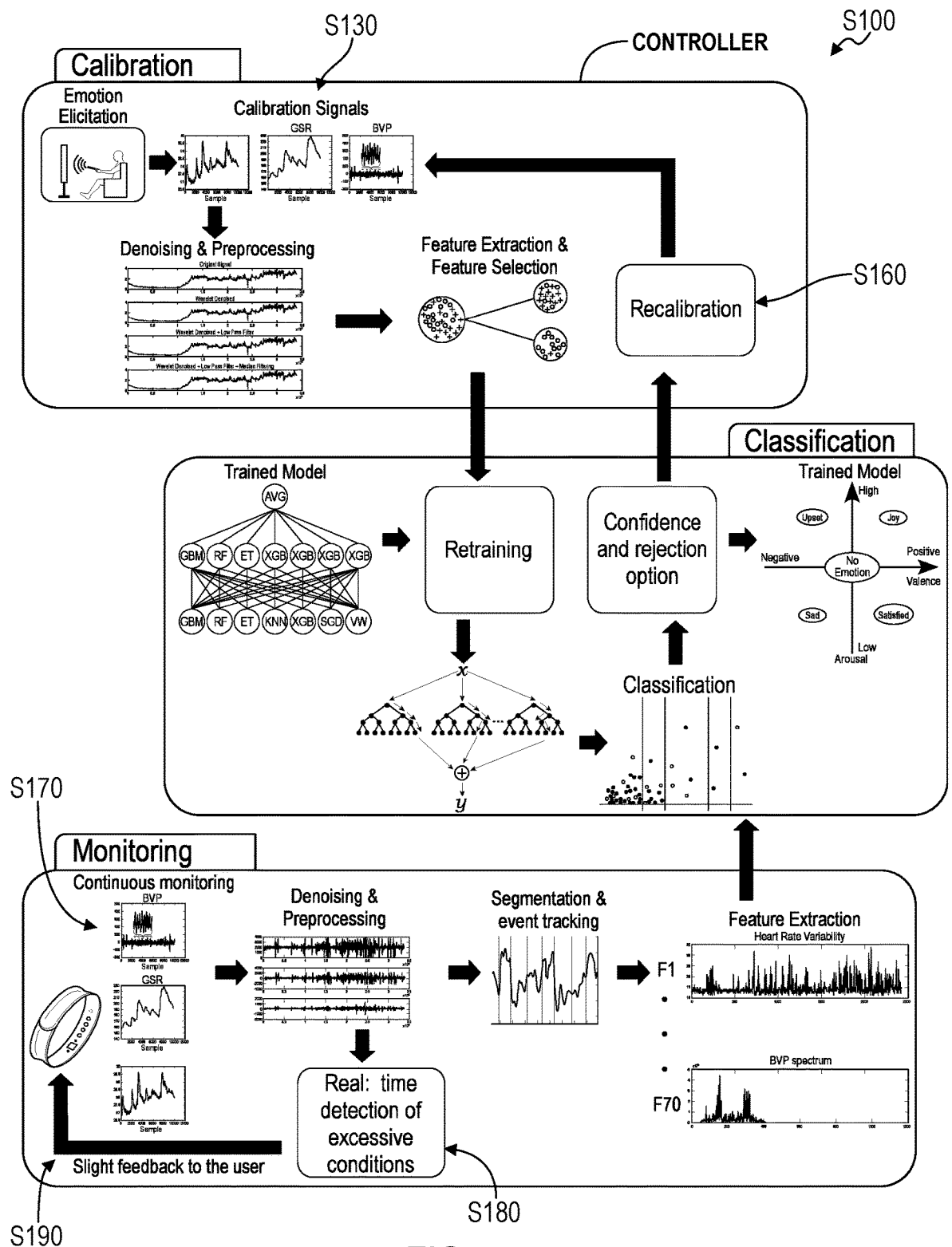
FIG. 7 is a schematic representation of one variation of the method.

One variation of the method S100 shown in FIGS. 3 and 7 includes, at a third period of time succeeding the second period of time: recording a third timeseries of biosignal data via the set of sensors integrated into the wearable device worn by the user; detecting a third instance of the first target emotion exhibited by the user based on the third timeseries of biosignal data and the emotion model; and—in response to detecting the third instance of the first target emotion— prompting the user to confirm the third instance of the first target emotion. Additionally—in response to the user denying the third instance of the first target emotion—the companion application can: flag the first emotion marker; label the second emotion marker as not associated with the first target emotion; and update the emotional model for the user by reducing a confidence level associated with the flagged first emotion marker and generate a new emotion marker for the labeled second emotion marker.

In one implementation, the companion application can increase the confidence threshold required to signal the user of an instance of the target emotion based on the number of user rejections of previous notifications (e.g., prior to receiving a user rejection, signaling the user of an instance of the target emotion in response to detecting a 60%+ confidence level and—after receiving a user rejection—signaling the user of an instance of the target emotion only in response to detecting a 70%+ confidence level).

In another implementation, the wearable device can—if a minimum time increment has not yet elapsed since the second instance of the target emotion—group the second instance of the target emotion and the third instance of the target emotion into a single instance of the target emotion such that the wearable device can avoid over signaling the user.

In one implementation, the system can identify long-term user trends in the biosignal data indicating symptoms of certain mental health conditions or disorders (e.g., depression, chronic anxiety, etc.). For example, the wearable device can: detect accelerometer data indicating the user is engaging in physical activity less daily on average than a baseline threshold (e.g., laying in bed all day and not leaving the house); detect biosignal data (e.g., EDA, PPG, etc.)

indicating recurring negative emotions; and prompt the user to contact her therapist to discuss possible depression exhibited by the user.

14.1 Emotion Types

Blocks of the method S100 recite, prompting the user to identify an emotion type associated with an instance of the first target emotion; and updating the emotion model with the emotion type. Generally, the system can: detect the second instance of the first target emotion via the wearable device as described above; prompt the user to choose an emotion type (e.g., happy, sad, stressed, distressed, overjoyed, nostalgic, etc.) via the user's mobile device; and label the second instance of the first target emotion with the emotion type input by the user. In one implementation—if the emotion type input by the user matches the first target emotion—the companion application can update the emotion model to assign a higher confidence level to the second timeseries of biosignal data acquired by the wearable device. In another implementation,—if the emotion type input by the user does not match the first target emotion—the companion application can update the emotion model to label the second timeseries of biosignal data acquired by the wearable device as the emotion type input by the user instead of the first target emotion such that if the wearable device detects a new timeseries of biosignal data similar to the second timeseries of biosignal data, the system can signal the user regarding the new target emotion.

Blocks of the method S100 recite, at a third time succeeding the second time: prompting the user to identify an emotion intensity associated with the second instance of the first target emotion; and updating the emotion model with the emotion intensity. Generally, the system can—via the user's mobile device—prompt the user to select an intensity of the instance of the target emotion (e.g., on a scale from one to ten). The companion application can then update the biosignal data in the emotion model to reflect the intensity of the emotion.

As a person skilled in the art will recognize from the previous detailed description and from the figures and claims, modifications and changes can be made to the embodiments of the invention without departing from the scope of this invention as defined in the following claims.

We claim:

1. A method for tracking emotions of a user comprising:
outputting a prompt to the user to orally recite a story predicted to elicit a first target emotion;
recording a voice recording of the user reciting the story during a first period of time;
during the first period of time, recording a first timeseries of biosignal data via a set of sensors integrated into a wearable device worn by the user, the first timeseries of biosignal data comprising a first biosignal value recorded at a first time during the first period of time;
accessing a first timeseries of emotion markers extracted from the voice recording and comprising a first emotion marker indicating a first instance of the first target emotion, exhibited by the user, at approximately the first time;
combining the first timeseries of biosignal data with the first timeseries of emotion markers to generate a first emotion-labeled timeseries of biosignal data, the first emotion-labeled timeseries of biosignal data comprising the first biosignal value labeled with the first emotion marker;
detecting a set of biosignal changes in the first emotion-labeled timeseries of biosignal data;
deriving a set of correlations between the set of biosignal changes and emotion markers in the first emotion-labeled timeseries of biosignal data;
calibrating a first emotion model, based on the set of correlations, to detect instances of the first target emotion exhibited by the user based on biosignals of the user; and
during a second period of time succeeding the first period of time:
recording a second timeseries of biosignal data via the set of sensors integrated into the wearable device worn by the user; and
detecting a second instance of the first target emotion exhibited by the user based on the second timeseries of biosignal data and the first emotion model and exclusive of voice data captured during the second period of time; and
in response to detecting the second instance of the first target emotion:
prompting the user to define a trigger associated with the first target emotion via a mobile device; and
logging the trigger in the first emotion model.

2. The method of claim 1, further comprising, in response to detecting the second instance of the first target emotion:
prompting the user to confirm the second instance of the first target emotion; and
in response to the user denying the second instance of the first target emotion:
labeling the second timeseries of biosignal data as not associated with the first target emotion; and
updating the first emotion model for the user to reflect the second timeseries of biosignal data as not associated with the first target emotion.

3. The method of claim 1, wherein accessing the first timeseries of emotion markers comprises:
extracting pitch data, voice speed data, voice volume data, and pure tone data from the voice recording;
detecting a set of instances of the first target emotion during the first period of time based on the pitch data, voice speed data, voice volume data, and pure tone data; and
for each instance of the first target emotion in the set of instances of the first target emotion, labeling the instance of the first target emotion with an emotion marker, in the timeseries of emotion markers, timestamped according to a time the instance of the first target emotion is represented in the voice recording.

4. The method of claim 1, wherein prompting the user to orally recite the story predicted to elicit the first target emotion comprises prompting the user to orally recite a personal story associated with a user experience predicted to elicit the first target emotion.

5. The method of claim 1, further comprising:
displaying a predefined written story to the user via a mobile device, the written story predicted to elicit the target emotion; and
prompting the user to orally recite the written story associated with the target emotion.

6. The method of claim 1:
wherein prompting the user to orally recite the story associated with a first target emotion comprises prompting the user to orally recite the story associated with a first target emotion comprising a negative emotion; and
wherein accessing the first timeseries of emotion markers comprises accessing the first timeseries of emotion markers, extracted from the voice recording, comprising the first emotion marker indicating a change in primary type of emotion exhibited by the user toward the negative emotion.

7. The method of claim 1, further comprising:
prompting the user to identify an emotion intensity of the second instance of the first target emotion interpreted from the second timeseries of biosignal data; and
recalibrating the first emotion model according to the emotion intensity of the second instance of the first target emotion.

8. The method of claim 1, further comprising:
receiving a manual input from the user identifying a third instance of the first target emotion at a third time succeeding the second period of time; and
in response to receiving the manual input:
labeling a third timeseries of biosignal data recorded at the third time with a third emotion marker indicating the first target emotion; and
recalibrating the first emotion model, for the user, based on the third timeseries of biosignal data and the third emotion marker.

9. The method of claim 1, further comprising:
selecting a second target emotion different from the first target emotion;
outputting a second prompt to the user to orally recite a second story associated with the second target emotion;
accessing a second voice recording of the user reciting the second story during a third period of time between the first period of time and the second period of time;
accessing a second timeseries of emotion markers:
extracted from the second voice recording; and
indicating the second target emotion exhibited by the user during the third period of time;
during the third period of time, recording a second timeseries of biosignal values via the set of sensors integrated into the wearable device worn by the user;
detecting a second set of biosignal changes in the second timeseries of biosignal data;
deriving a second set of correlations between the second set of biosignal changes and concurrent emotion markers in the second timeseries of emotion markers;
calibrating a second emotion model, based on the second set of correlations, to detect instances of the second target emotion exhibited by the user based on biosignals of the user; and
during the second period of time, detecting an instance of the second target emotion exhibited by the user based on the second timeseries of biosignal data and the second emotion model and exclusive of voice data captured during the second period of time.

10. The method of claim 1, further comprising:
selecting a second target emotion different from the first target emotion;
outputting a second prompt to the user to orally recite a second story associated with the second target emotion;
accessing a second voice recording of the user reciting the second story during a third period of time between the first period of time and the second period of time;
accessing a second timeseries of emotion markers:
extracted from the second voice recording; and
indicating the second target emotion exhibited by the user during the third period of time;
during the third period of time, recording a second timeseries of biosignal values via the set of sensors integrated into the wearable device worn by the user;
detecting a second set of biosignal changes in the second timeseries of biosignal data;
deriving a second set of correlations between the second set of biosignal changes and concurrent emotion markers in the second timeseries of emotion markers;
recalibrating the first emotion model, based on the second set of correlations, to detect a change from the first target emotion to the second target emotion exhibited by the user based on biosignals of the user; and
during the second period of time, detecting an instance of the second target emotion exhibited by the user based on the second timeseries of biosignal data and the second emotion model and exclusive of voice data captured during the second period of time.

11. The method of claim 1:
further comprising accessing a first generic emotion model linking biosignals to the first target emotion; and
wherein calibrating the first emotion model comprises calibrating the first generic emotion model based on the set of correlations, to generate the first emotion model unique to the user.

12. A method for tracking emotions of a user comprising:
outputting a prompt to the user to orally recite a story predicted to elicit a first target emotion;
recording a voice recording of the user reciting the story during a first period of time;
during the first period of time, recording a first timeseries of biosignal data via a set of sensors integrated into a wearable device worn by the user, the first timeseries of biosignal data comprising a first biosignal value recorded at a first time during the first period of time;
accessing a first timeseries of emotion markers extracted from the voice recording and comprising a first emotion marker indicating a first instance of the first target emotion, exhibited by the user, at approximately the first time;
combining the first timeseries of biosignal data with the first timeseries of emotion markers to generate a first emotion-labeled timeseries of biosignal data, the first emotion-labeled timeseries of biosignal data comprising the first biosignal value labeled with the first emotion marker;
detecting a set of biosignal changes in the first emotion-labeled timeseries of biosignal data;
deriving a set of correlations between the set of biosignal changes and emotion markers in the first emotion-labeled timeseries of biosignal data;
calibrating a first emotion model, based on the set of correlations, to detect instances of the first target emotion exhibited by the user based on biosignals of the user;
during a second period of time succeeding the first period of time:
recording a second timeseries of biosignal data via the set of sensors integrated into the wearable device worn by the user; and
detecting a second instance of the first target emotion exhibited by the user based on the second timeseries of biosignal data and the first emotion model and exclusive of voice data captured during the second period of time; and
in response to detecting the second instance of the first target emotion during the second period of time:
notifying the user of the second instance of the first target emotion;
accessing a coaching protocol associated with the first target emotion, the coaching protocol comprising a coaching activity to alter the emotional state of the user; and prompting the user to complete the coaching activity via a mobile device.

13. A method for tracking emotions of a user comprising:
outputting a prompt to the user to orally recite a story associated with a first target emotion comprising a positive emotion;
recording a voice recording of the user reciting the story during a first period of time;
during the first period of time, recording a first timeseries of biosignal data via a set of sensors integrated into a wearable device worn by the user, the first timeseries of biosignal data comprising a first biosignal value recorded at a first time during the first period of time;
accessing a first timeseries of emotion markers, extracted from the voice recording, comprising a first emotion marker indicating a change in primary type of emotion exhibited by the user toward the positive emotion at approximately the first time;
combining the first timeseries of biosignal data with the first timeseries of emotion markers to generate a first emotion-labeled timeseries of biosignal data, the first emotion-labeled timeseries of biosignal data comprising the first biosignal value labeled with the first emotion marker;
detecting a set of biosignal changes in the first emotion-labeled timeseries of biosignal data;
deriving a set of correlations between the set of biosignal changes and emotion markers in the first emotion-labeled timeseries of biosignal data;
calibrating a first emotion model, based on the set of correlations, to detect instances of the first target emotion exhibited by the user based on biosignals of the user; and
during a second period of time succeeding the first period of time:
recording a second timeseries of biosignal data via the set of sensors integrated into the wearable device worn by the user; and
detecting a second instance of the first target emotion exhibited by the user based on the second timeseries of biosignal data and the first emotion model and exclusive of voice data captured during the second period of time.

14. A method for tracking emotions of a user comprising:
selecting a first target emotion from a list of target emotions;
outputting a prompt to the user to orally recite a story associated with the first target emotion;
accessing a voice recording of the user reciting the story during a first period of time;
accessing a first timeseries of emotion markers:
extracted from the voice recording; and
indicating the first target emotion exhibited by the user during the first period of time;
during the first period of time, recording a first timeseries of biosignal values via a set of sensors integrated into a wearable device worn by the user;
detecting a first set of biosignal changes in the first timeseries of biosignal data;
deriving a set of correlations between the first set of biosignal changes and concurrent emotion markers in the first timeseries of emotion markers;
accessing a first generic emotion model linking biosignals to the first target emotion;
calibrating the first generic emotion model based on the set of correlations, to generate a first emotion model unique to the user, the first emotion model linking characteristics of the first set of biosignal changes to the first target emotion exhibited by the user; and
during a second period of time succeeding the first period of time:
recording a second timeseries of biosignal data via the set of sensors integrated into the wearable device worn by the user; and
detecting a second instance of the first target emotion exhibited by the user based on the second timeseries of biosignal data and the first emotion model.

15. The method of claim 14, further comprising:
selecting a second target emotion different from the first target emotion;
selecting a second target emotion from a list of target emotions;
outputting a second prompt to the user to orally recite a second story associated with the second target emotion;
accessing a second voice recording of the user reciting the second story during a second period of time;
accessing a second timeseries of emotion markers:
extracted from the second voice recording; and
indicating the second target emotion exhibited by the user during the second period of time;
during the second period of time, recording a second timeseries of biosignal values via a set of sensors integrated into a wearable device worn by the user;
detecting a second set of biosignal changes in the second timeseries of biosignal data;
deriving a second set of correlations between the second set of biosignal changes and concurrent emotion markers in the second timeseries of emotion markers;
recalibrating the first emotion model, based on the second set of correlations, to detect a change from the first target emotion to the second target emotion exhibited by the user based on biosignals of the user; and
during the second period of time, detecting an instance of the second target emotion exhibited by the user based on the second timeseries of biosignal data and the second emotion model and exclusive of voice data captured during the second period of time.

16. A method for tracking emotions of a user comprising:
presenting a list of target emotions to the user;
prompting the user to select from the list of target emotions;
in response to receiving selection of a first target emotion, in the list of target emotions, from the user, prompting the user to orally recite a memory that the user personally associates with the first target emotion;
accessing a voice recording of the user reciting the story during a first period of time;
accessing a first timeseries of emotion markers:
extracted from the voice recording; and
indicating the first target emotion exhibited by the user during the first period of time;
during the first period of time, recording a first timeseries of biosignal values via a set of sensors integrated into a wearable device worn by the user;
detecting a first set of biosignal changes in the first timeseries of biosignal data;
deriving a set of correlations between the first set of biosignal changes and concurrent emotion markers in the first timeseries of emotion markers;
generating a first emotion model, for the user, linking characteristics of the first set of biosignal changes to the first target emotion exhibited by the user based on the set of correlations; and during a second period of time succeeding the first period of time:
   recording a second timeseries of biosignal data via the set of sensors integrated into the wearable device worn by the user; and
   detecting a second instance of the first target emotion exhibited by the user based on the second timeseries of biosignal data and the first emotion model.

17. A method for tracking emotions of a user comprising:

presenting a list of target emotions to the user;

prompting the user to select from the list of target emotions;

in response to receiving selection of a first target emotion, in the list of target emotions, from the user, prompting the user to orally recite a generic emotional story, from a set of preloaded emotional stories, structured to elicit the first target emotion;

accessing a voice recording of the user reciting the story during a first period of time;

accessing a first timeseries of emotion markers:
   extracted from the voice recording; and
   indicating the first target emotion exhibited by the user during the first period of time;

during the first period of time, recording a first timeseries of biosignal values via a set of sensors integrated into a wearable device worn by the user;

detecting a first set of biosignal changes in the first timeseries of biosignal data;

deriving a set of correlations between the first set of biosignal changes and concurrent emotion markers in the first timeseries of emotion markers;

generating a first emotion model, for the user, linking characteristics of the first set of biosignal changes to the first target emotion exhibited by the user based on the set of correlations; and during a second period of time succeeding the first period of time:
   recording a second timeseries of biosignal data via the set of sensors integrated into the wearable device worn by the user; and
   detecting a second instance of the first target emotion exhibited by the user based on the second timeseries of biosignal data and the first emotion model.

\* \* \* \* \*